United States Patent [19]

Heck et al.

[11] Patent Number: 4,712,083
[45] Date of Patent: Dec. 8, 1987

[54] POSITION SENSOR

[75] Inventors: Wolfgang Heck, Gerlingen; Peter Kersten, Leonberg; Hans Volz, Schwieberdingen, all of Fed. Rep. of Germany

[73] Assignee: Alcatel N. V., Amsterdam, Netherlands

[21] Appl. No.: 812,170

[22] Filed: Dec. 23, 1985

[30] Foreign Application Priority Data

Dec. 24, 1984 [DE] Fed. Rep. of Germany ....... 3447325

[51] Int. Cl.⁴ .......................................... H01L 43/00
[52] U.S. Cl. .................................. 338/32 R; 324/208
[58] Field of Search ........................... 338/32 R, 32 H; 324/207, 208

[56] References Cited

U.S. PATENT DOCUMENTS 3,716,781  2/1973  Almasi et al. ............... 338/32 R X
4,361,805  11/1982  Narimatsu et al. ................ 324/207
4,403,187  9/1983  Takahashi et al. .................. 324/208

Primary Examiner—E. A. Goldberg
Assistant Examiner—M. M. Lateef
Attorney, Agent, or Firm—Christie, Parker & Hale

[57] ABSTRACT

A high-resolution position sensor utilizes a detector having at least one flat magnetic-field-dependent resistor, in stripe form, whose ends are connectable to an output voltage, and a magnetizable device which is moveable relative to the magnetic-field-dependent resistor and has portions transverse to the direction of movement which exhibit alternately different space permeabilities, with the magnetic-field-dependent resistor extending parallel to and at a distance from said portions by the magnetic-field-dependent resistor. The magnetic field dependent resistor displays anisotropy in the longitudinal direction of the stripes. At least in the area of the magnetic-field-dependent resistor the device is magnetized in or opposite the direction of movement.

20 Claims, 11 Drawing Figures

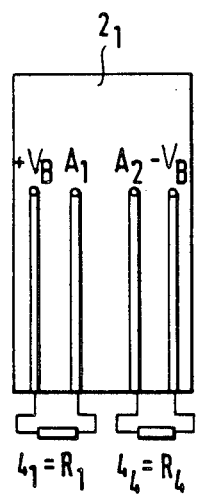
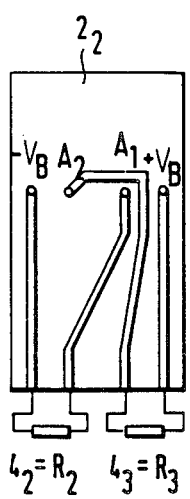
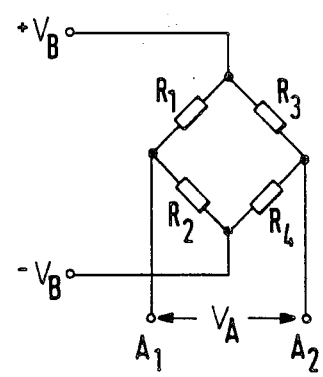
Fig.8　Fig.9　Fig.10
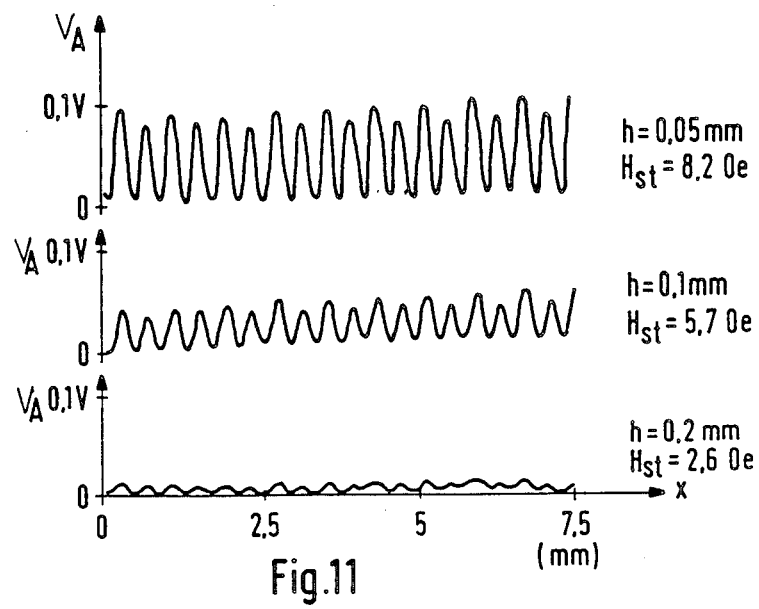
Fig.11

POSITION SENSOR

BACKGROUND OF THE INVENTION

The present invention relates to a position sensor.

A position sensor is known from German Disclosed patent application No. 2,426,420. The purpose of such a sensor is to permit a high degree of resolution and sensitivity. To accomplish this purpose in the prior art, the magnetic-field-dependent semiconductor devices are disposed in a plane of the inductor surface, and the magnetic-field-dependent semiconductor resistors in stripe form have a width of 100 μm, for example, and a thickness of about 20 μm. The distance to the detected portions therefore amounts to at least 100 μm as well.

SUMMARY OF THE INVENTION

It is the object of the present invention to solve the problem of further increasing the resolution properties of position sensors of the nature. This object is solved by the various embodiments of the invention. Since the magnetic-field-dependent resistors employed therein have a non-linear characteristic the same deflection is obtained at each end of a portion, i.e., on each side of a tooth of a toothed wheel, for example, and thus twice as many pilses are obtained as in the case of known position sensors of the above-recited nature, which represents a resolution that is two times greater. Moreover, the distance of the portions can be chosen to be of the order of the thickness of the magnetic-field-dependent resistors, which is much smaller than the width of the known strips, thereby permitting a further increase in resolution to be obtained.

BRIEF DESCRIPTION OF THE DRAWINGS

Further advantageous details of the present invention are contained in the subclaims and described below on the basis of the practical examples illustrated in the drawings, in which

FIGS. 8, 9 and 10 show the schematic arrangement of four sensors to form a bridge circuit; and FIG. 11 shows the measurement curves of the output voltages obtained, as a function of the distance of the sensors from the magnetizable device.

Figure 1:
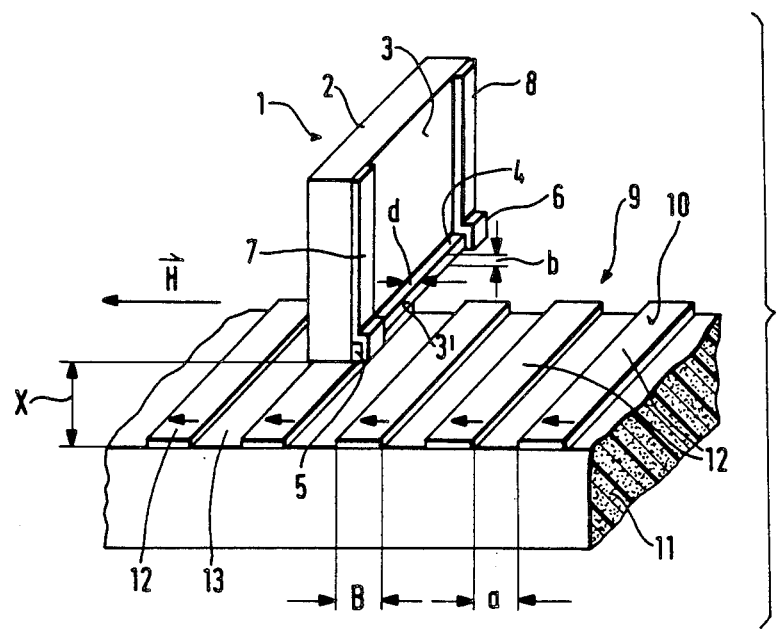
FIG. 1 is a perspective view of an embodiment having one sensor and one stray-field mask applied to a substrate.

Numeral 1 denotes a detector for the detection of magnetic fields. Detector 1 comprises a support 2, on whose surface 3 a magnetic-field-dependent resistor stripe 4 of ferromagnetic material is deposited at the bottom edge by means of thin-film techniques. The coating thickness of magnetic-field-dependent resistor 4 amounts to approximately up to 0.5 μm. This strip is fabricated in a known manner, for example, by means of sputtering a CoFeB alloy. Glass or ceramic, for example, is employed as the support. The ends 5, 6 of magnetic-field-dependent resistor 4 are connected in an electrically conductive manner with contact stripes 7, 8 which are also deposited on support 2.

Disposed below detector 1 at a minor distance x therefrom is a magnetizable device 9, having a periodically alternating magnetic field above its surface 10. In the example according to FIG. 1, a periodically alternating magnetic field of this nature is formed by means of a so-called stray-field mask, which comprises a strip-like or annular substrate 11 of non-magnetic or soft or hard magnetic material which supports soft or hard magnetic stripes 12 extending transversely to the longitudinal direction. The direction of magnetization H is the same in all stripes 12, extending at least generally in or opposite the direction of movement or the longtitudinal direction of substrate 11. Consequently, the top 10 of device 9 has portions 12, having a width B, of higher space permeability and spaces or portions 13 of lower space permeability. The width a of the latter portions 13 is preferably equal to distance B.

Figure 2:
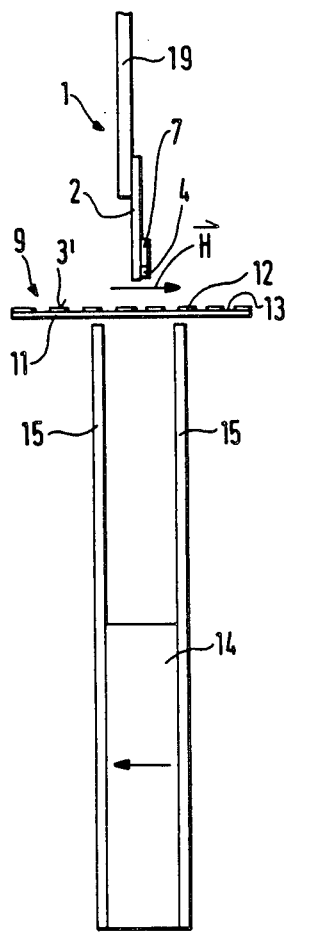
FIG. 2 shows an exploded view of the arrangement according to FIG. 1 having an excitation magnet.

Air or a non-magnetic metal such as aluminum, etc. or a dielectric substance is preferably located in portions 13. Consequently, a magnetic field having a periodically alternating higher and lower flux line density and alternating flux line direction forms above surface 10 if at least strips 12 are permanently magnetic or are magnetized in the indicated direction. As shown in FIG. 2 if a thin substrate 11 that is not permanently magnetic or stripes 12 of soft magnetic material are employed, for example, a magnet 14, having lateral yokes 15 facing substrate 11, for example, is disposed beneath substrate 11, which magnetizes stripes 12 and, if necessary, substrate 11, as well, in the direction of field H.

Device 9 and detector 1 are movable one relative to the other. Device 9 is customarily designed in the form of a wheel or ring and pivotally mounted, in which case it is then practical for device 9 to consist of a toothed disk or ring.

It was found that ferromagnetic coatings having the indicated coating thickness and anisotropy in the direction of the longitudinal extension of the stripe respond only to magnetic fields that are located in the plane of the coating. Pursuant to the present invention, preferably during the fabrication of magnetic-field-dependent resistor 4, magnetic-field-dependent resistor 4 is therefore subjected in only one dimension, namely the length thereof, to such a magnetic field that the above-mentioned direction is an easy direction. If a magnetic field having a component in the plane of the coating that is transverse to the easy direction acts on a magnetic-field-dependent resistor of this nature, there is a change in the resistance measured between contact strips 7 and 8. In the present invention, this effect is utilized for detection of small magnetic fields, as the indicated change in resistance occurs even in the case of very low field strengths. Yet, nevertheless, no disturbances are caused by external magnetic fields.

Figure 4:
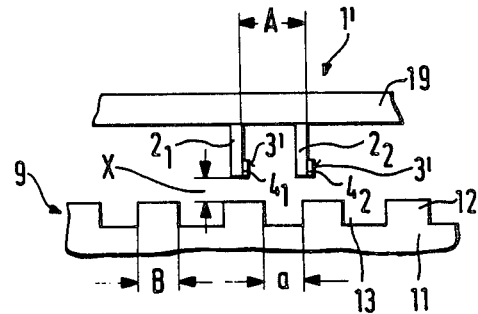
FIG. 4 shows the arrangement of two pairs of sensors relative to a common, magnetizable device.
Figure 6:
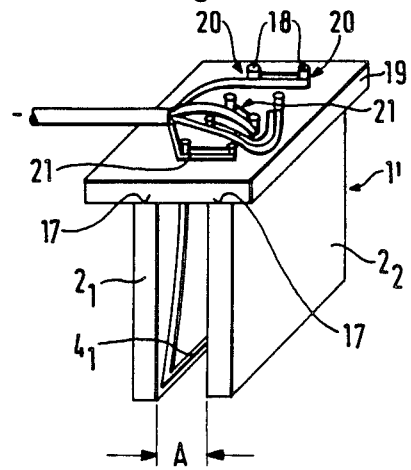
FIG. 6 shows a perspective view of a detector based upon two pairs of sensors according to FIGS. 3 or 5.
Figure 6:
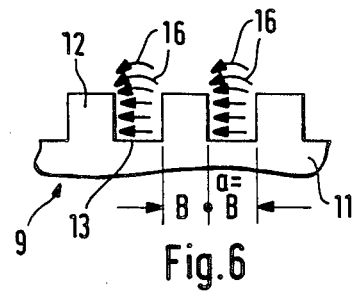

As a result of portions 12, 13, which are of different space permeability, stray fields which are alternately opposite one to the other are obtained above each portion 12, 13. This is illustrated in FIGS. 4 and 6. Consequently, a field component $H_{St}$ that is transverse to field H is produced on each side of a tooth or strip. While this field component $H_{St}$ is very small, being on the order of 80 to 1,600 A/m (1 to 20 Oersteds), for example, it is sufficient to significantly influence the resistance of magnetic-field-dependent resistor 4 if field component $H_{st}$ is transverse to the direction of anisotropy. Magnetic-field-dependent resistors 4, with their coating planes 3', are therefore arranged in the direction of field components $H_{St}$, as illustrated in the examples. However it is also possible to arrange coating plane 3' in the direction of movement. In this case, the field component $H_L$, which extends in the direction of movement, is detected. With an arrangement of this nature, however, care must be taken to ensure that the producing stray field does not already greatly influence the magnetic-field-dependent resistor and saturate it in the case of magnetization produced by an external magnet, for example magnetization of portions 12. Consequently, this type of arrangement of coating plane 3' in the direction of movement can only be employed for permanently magnetized portions 12.

Figure 3:
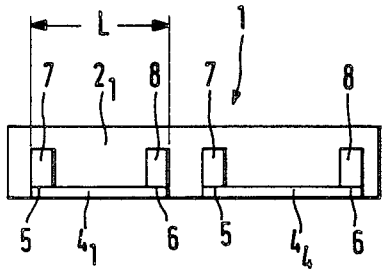
FIG. 3 shows the arrangement of one pair of sensors on a common substrate.
Figure 5:
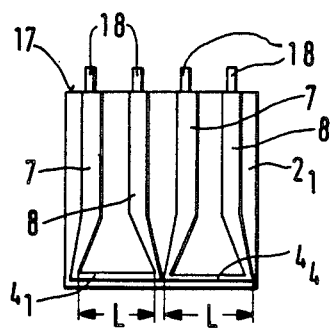
FIG. 5 shows an embodiment of a pair of sensors on a common substrate.
Figure 7:
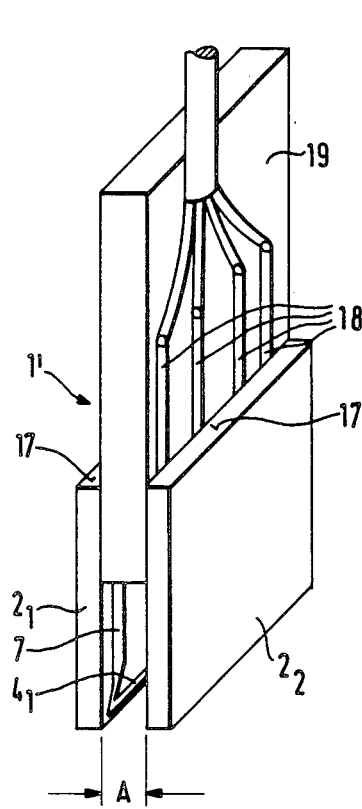
FIG. 7 shows a perspective view of a further possible embodiment of a detector comprising two units according to FIG. 5.

Pursuant to an advantageous embodiment of the present invention and as shown in FIGS. 3 and 5, two magnetic-field-dependent resistors $4_1$ and $4_4$, which are electrically isolated one from the other, are arranged adjacent one to the other in a line on a support 2 for the purpose of increasing the possible output voltage. The length L of a stripe 12 or a tooth of a gear or a toothed disk or a rack is then at least great enough so that it extends over the entire length of the pair of resistors comprising both magnetic-field-dependent resistors $4_1$ and $4_4$. Connection pins 18 are provided at the upper edge 17 in FIG. 5. These two magnetic-field-dependent resistors $4_1$, $4_4$ can be placed in diagonally opposed arms of a bridge.

Pursuant to one of the embodiments illustrated in FIGS. 4 and 6 to 9, two pairs each of magnetic-field-dependent resistors $4_1$, $4_4$ and $4_2$, $4_3$ are combined into a detector unit 1', with magnetic-field-dependent resistors $4_1$ and $4_4$ being disposed on a first support $2_1$ and other magnetic-field-dependent resistors $4_2$ and $4_3$ on a second support $2_2$. Magnetic-field-dependent resistors $4_2$ and $4_3$ can then be interposed in the other diagonal arms of a bridge circuit, as illustrated in FIG. 10. This produces a maximum measurement output voltage $V_a$ at terminals $A_1$ and $A_2 + V_B$ and $-V_B$ denote the operating voltage, which amounted to 10 Volts in the case of one embodiment, for example.

For an optimum measured value magnitude, the distance A shown in FIG. 6 between pairs of resistors $4_1$, $4_4$ and $4_2$, $4_3$ is equal to the number n of stripes 12 or portions 13 between the pairs of resistors, plus one half of width B of a stripe 12, in accordance with the formula $A = n \cdot a + B/2$, where $n = 0, 1, 2, \ldots$. The magnitude of output voltage $U_A$ is a function of distance x between magnetic-field-dependent resistors $4_1$ to $4_4$ and surface 10. This interrelationship is illustrated in the measurement curves contained in FIG. 11.

In order to obtain a rugged detector unit 1', supports $2_1$, $2_2$ are arranged on a mounting plate 19, in accordance with FIG. 6. The thickness of mounting plate 19 corresponds to required distance A. Supports $2_1$, $2_2$ can also be attached to a mounting plate 19 that is arranged at right angles thereto on upper edge 17, in accordance with FIG. 7. In this case, mounting plate 19 has openings 20 extending therethrough, arranged in accordance with connection pins 18. Openings 20 are arranged in such a manner that distance A is obtained when connection pins 18 of supports $2_1$, $2_2$ are inserted and that this distance can be adjusted, if necessary. In both cases, mounting plate 19 can be provided with the required connection and/or feed lines 21 in the manner of a printed circuit, as illustrated by means of the dashed lines in FIG. 7. Mounting plate 19 and supports $2_1$, $2_2$ are preferably attached one to the other by means of bonding and/or soldering.

We claim:

1. A position sensor comprising a first support, at least one flat, magnetic-field-dependent resistor in stripe form deposited on said support, said resistor having a longitudinal axis and ends connectable to an output voltage, and a magnetizable device which is movable relative to the magnetic-field-dependent resistor and has portions transverse to the direction of movement which exhibit alternately different space permeabilities, with the magnetic-field-dependent resistor extending parallel to and at a distance from said portions, said resistor having a uniaxial anisotropy, with the easy-axis direction being parallel to the longitudinal axis of said stripe.

2. The position sensor of claim 1, wherein at least in the area of the magnetic-field-dependent resistor, the device is magnetized in or opposite the direction of movement.

3. The position sensor of claim 1, wherein the magnetic field dependent resistor is made of ferromagnetic material.

4. The position sensor of claim 1, wherein the magnetic field dependent resistor has a maximum thickness of 0.5 micrometers.

5. The position sensor of claim 1, further comprising another magnetic field dependent resistor, electrically isolated from the at least one magnetic field-dependent resistor disposed adjacent to at least one magnetic field dependent resistor in a line on said support.

6. The position sensor of claim 5 wherein the portions of different space permeability are of equal width and further comprising a second support having two second support magnetic-field-dependent resistors electrically isolated one from the other and from the resistors on said first support, said two second support resistors being arranged parallel one to the other and to the resistors on said first support in such a manner that the resistors on said first support are separated from the resistors on said second support by a distance $$A = (2n+1)$$

where
$n = 0, 1, 2, \ldots$ is the number of said portions of said magnetizable device of different space permeabilities located between the pairs of magnetic-field-dependent resistors.

7. The position sensor according to claim 1 wherein the device contains a stray-field mask comprising the portions of different space permeability.

8. The position sensor according to claim 1 wherein the device is designed in the form of a portion of a rack.

9. The position sensor according to claim 1, wherein the device is designed in the form of a toothed disk.

10. The position sensor according to claim 1 wherein the portions are made of alternate non-magnetic and magnetic materials.

11. The position sensor according to claim 1 wherein the portions of higher space permeability, and the support therefor are made of soft magnetic material which, at least in the area of the magnetic-field-dependent resistors is magnetized in or opposite to the direction of movement by means of a constant magnetic field, and wherein the longitudinal axis of the magnetic-field-dependent resistors is disposed at least almost transverse to the direction of movement and to the surface of the portions.

12. The position sensor according to claim 1, wherein the portions of higher space permeability, and the support therefor are made of hard magnetic material and are magnetized in or opposite the direction of movement.

13. The position sensor according to claim 12 wherein the surfaces of the magnetic-field-dependent resistors extend parallel to the direction of movement and parallel to the surface of the portions.

14. The position sensor according to claim 6 wherein the two pairs of resistors are located on a common support and employed in a bridge circuit, and one magnetic-field-dependent resistor of each pair of resistors is interposed in an arm of the bridge that is diagonally opposite the respective other magnetic-field-dependent resistor.

15. The position sensor according to claim 1, wherein projecting connection pins are disposed on the upper edge of the support(s) which is located opposite the magnetic-field-dependent resistor.

16. The position sensor according to claim 6 wherein said first and second supports are respectively attached on either side each of a mounting plate having a thickness approximately equal to the distance (A).

17. The position sensor according to claim 6, wherein a mounting plate is disposed on the upper edge of the supports with the mounting plate having openings arranged in such a manner as to produce at least an approximation of the distance (A).

18. The position sensor according to claim 1 wherein the support is made of glass.

19. The position sensor according to claim 1 wherein the support ismade of ceramic.

20. The position sensor according to claim 1 wherein said portions of said magnetizable device which exhibit different space permeabilities define a first plane in the vicinity of said support and said flat, magnetic-field-dependent resistor defines a second plane perpendicular to said first plane, whereby the stray-field component $H_{St}$ at the boundary of two portions of said magnetizable device having different space permeability may be detected.

* * * * *